F. E. RICKETTS.
TORQUE REGULATOR.
APPLICATION FILED MAY 25, 1911.
1,286,415.
Patented Dec. 3, 1918.
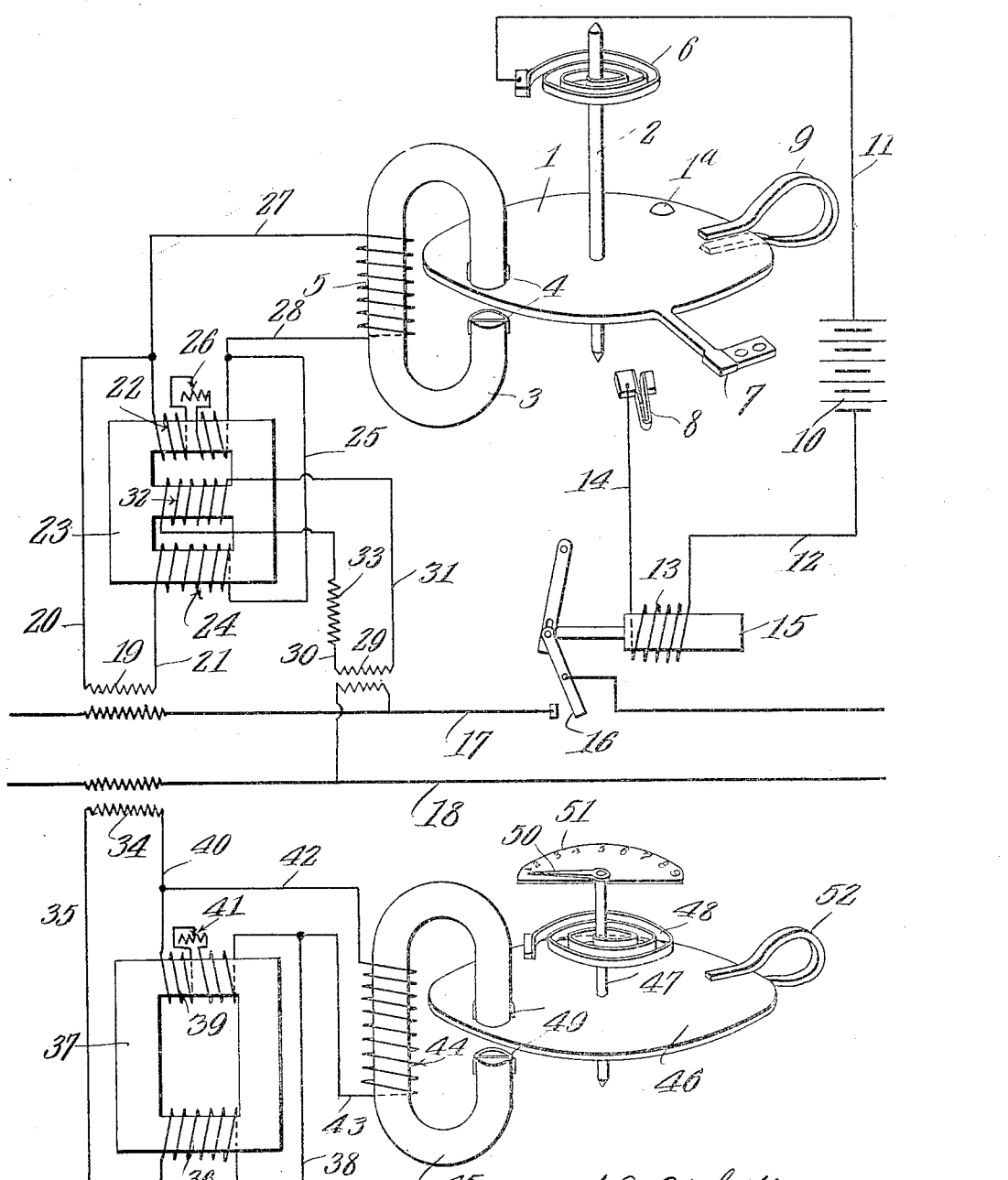
WITNESSES
Frank B. Wooden
Louis Mardaga.
Forrest E. Ricketts.
INVENTOR.

UNITED STATES PATENT OFFICE.

FORREST E. RICKETTS, OF BALTIMORE, MARYLAND, ASSIGNOR TO WESTINGHOUSE ELECTRIC & MANUFACTURING COMPANY, A CORPORATION OF PENNSYLVANIA.

TORQUE-REGULATOR.

1,286,415.  Specification of Letters Patent.  Patented Dec. 3, 1918.

Application filed May 25, 1911. Serial No. 629,522.

*To all whom it may concern:*

Be it known that I, FORREST E. RICKETTS, a citizen of the United States, residing in the city of Baltimore and State of Maryland, have invented a new and useful Torque-Regulator, of which the following is a specification.

The object of this invention is to provide means whereby the increasing torque in an alternating current meter is compensated for. In certain forms of alternating current meters the torque or the turning effort of the moving element varies as the square of the current. This in the case of indicating instruments gives a very irregular scale, and, when such instruments are used as relays for protecting the circuit in which they are placed from abnormal currents by setting in motion certain apparatus adapted for cutting out the circuit, all of these relays that happen to be in series at the time of surges of current will operate simultaneously. That is, when two circuits are connected in series, each being protected by one of these relays, no trouble that occurs on the circuit farthest from the source of current should cause the first relay from the source of current to operate. But if the current is very high, and the torque of the relays varies as the square of the current and the power opposed to the torque is constant, the relays will both operate instantly thereby interrupting both circuits.

According to the present invention, the current in the meter or relay winding depends upon the drop in voltage due to the ohmic resistance of a portion of the circuit, which therefore bears a constant ratio to the current flowing in that portion of the circuit, and upon the voltage induced in a portion of the circuit, which induced voltage bears a decreasing ratio to the current flowing in the circuit, because of the saturation of the magnetic circuit of the device.

It can be seen that by varying the amount of ohmic resistance in, and the amount of iron about, the portion of the circuit across which the voltage is taken to operate the meter or relay, as the case may be, an increasing torque can be compensated for to any desired degree. That is, the current in the meter will not increase in proportion to the current being measured.

The invention will be best understood by referring to the accompanying drawing which illustrates a portion of an electric circuit wherein the meters are provided with a convenient form of this new torque compensating device.

In the figure is shown a relay made up of a disk, —1— supported by a shaft —2— in operative relation to the pole faces of an electro-magnet —3—. A portion of each pole face of the magnet 3 is embraced by a short-circuit ring —4— the object of which is to produce in a portion of the disk a shifting field when alternating current is passed through a coil —5— wound on the magnet —3—. The effect of this shifting field is to cause the disk to rotate against the tension of a spring —6— to bring a contact —7— into contact with a contact —8—. The poles of a permanent horseshoe magnet —9— are placed near the surface of the disk so as to delay the movement of the disk by inducing therein local current. A piece of soft iron —1ᵃ— is fastened to the disk 1, so as to approach the permanent magnet 9 as the contact 7 approaches contact 8. The attraction between the magnet 9 and the piece of iron 1ᵃ will tend to prevent the speed of the disk from decreasing due to approximate balancing of electromagnetic torque on the disk 1 with that of the spring 6 as the contact 7 approaches contact 8, thereby giving the disk a more uniform rate of travel and securing positive engagement of the contacts.

A battery —10— is connected through conductor 11, spring 6, shaft 2 and disk 1 to contact 7 and through conductor 12, coil 13 and conductor 14 to contact 8, so that when contact 7 engages contact 8 a current flows from the battery through coil 13 which energizes the magnet 15 and opens a toggle switch —16—. The switch 16 is in the circuit of a conductor —17— which with conductor 18 forms a main circuit. Inserted in conductor 17 is a current transformer —19— adapted for supplying to conductors 20 and 21 current in proportion to the current flowing in conductor 17. Conductor 20 leads to one terminal of a coil —22— wound on one leg of an iron core —23—. Conductor 21 leads through a coil —24— wound on another leg of core 23, to conductor 25, which connects to the terminal of coil 22 opposite from conductor 20. Intermediate the coil 22 is an adjustable resistance —26— whereby the ohmic resistance of coil 22 can be varied. Conductors 27 and 28 connect coil 22 in parallel with coil 5. Across conductors 17 and 18 is connected a potential transformer —29— adapted for supplying to conductors 30 and 31 an electromotive force in proportion to that of the conductors 17 and 18.

Conductors 30 and 31 lead to the terminals of a coil —32— wound on a third leg of the core 23. Intermediate the conductor 30 is an ohmic resistance —33— the object of which is to hold the current in coil 32 substantially in phase with the voltage of conductors 17 and 18.

A current transformer —34— similar to 19 is inserted in conductor 18. A conductor —35— leads from one terminal of transformer 34 to one terminal of a coil —36— wound on one leg of an iron core —37—; the other terminal of coil 36 is connected by a conductor —38— to one terminal of a coil —39— wound on the other leg of core 37. A conductor —40— leads from the other terminal of coil 39 to transformer 34. There is inserted in the circuit of coil 39 an adjustable resistance —41—. Conductors 42 and 43 connect coil 39 in parallel with a coil —44— wound on a magnet core —45— having its pole faces in inductive relation to a disk —46—. The disk 46 is mounted on a shaft and is caused to rotate against the tension of a spring —48— by the action of shortcircuit rings —49— when alternating current is passed through coil 44. A pointer —50— is mounted on the shaft 47 so that when the disk rotates against the tension of the spring it will pass over a scale —51— calibrated to correspond with the value of the current flowing in the transformer 34. Near the surface of the disk 46 are the poles of a permanent magnet —52—, the object of the latter being to retard the movement of the disk 46.

Attention is called to the regularity of the scale 51 which is in contrast to such meters when used without a torque regulator. This meter is, however, of the ordinary type and would have a very irregular scale if used in the regular way, but when connected through the coils 36 and 39 as shown, the scale may be made with almost any characteristic.

In order to show more clearly the action of the coils 36 and 39 together with the magnetizable core 37 to compensate the torque of the disk 46, we will assume that the transformer 34 has a ratio of 1 to 1, and that an alternating current of one ampere is flowing through conductor 18. Then there will be delivered to leads 35 and 40 one ampere. This current will pass through coil 36 and conductor 38 to conductor 43, then it will divide, part going through coil 39, and if coil 39 is wound so that its magnetism will be in the same direction as that produced by coil 36, the effect will be to raise the voltage by induction across coil 39. There will also be a voltage drop produced in coil 39 due to its ohmic resistance and the current traversing it. The resultant voltage is such as to increase the current in coil 44, and, therefore, to increase the torque of the disk 46. Then assume that the current in conductor 18 has increased to three amperes, which will increase the current in leads 35 and 40 to three amperes, this current will flow through coil 36 producing less magnetism in proportion to the current than before, owing to the iron working at a greater degree of saturation. Therefore the induced voltage across coil 39 will be less in proportion to the current in the conductors 35 and 40 and since the voltage drop due to resistance will be in proportion to the current in the said coil, the resultant voltage will be less in proportion to the current in the conductors 35 and 40, and if the coils 36 and 39 and core 37 are properly proportioned, the current in coil 44 will be approximately three amperes or substantially the same as if coil 44 was connected directly to the transformer 34. In this case the torque will not be affected by the compensator. But when the current in conductor 18 increases to 6 amperes, there will be supplied to leads 35 and 40 six amperes, but the iron core 37 will be still more saturated and the induced voltage across coil 39 will be still less in proportion to the current in the conductors 35 and 40 and the drop across coil 39 due to its resistance will be in proportion to the current in the said coil. In this case the current in coil 44 will be less in proportion to the current in leads 35 and 40, and the torque of the disk will also be less in proportion to the current than if the transformer 34 were connected directly to the coil 44. Thus it can be seen that the compensator may be caused to increase the torque at low values of current and to decrease it at higher values of current; that is, it has a varying ratio. The value of this effect can be seen since in all alternating current meters of this type, the torque of the moving element varies as the square of the current, thus causing the meters to have very undesirable scales.

Suppose now that it is found advisable to limit the flow of current in lead 17 to six amperes, and the spring 6 has been adjusted so that six amperes flowing in coil 5 will produce just enough torque in the disk 1 to bring contact 7 into engagement with contact 8. Then if coils 22 and 24 and core 23 are properly proportioned to give a 1 to 1 ratio at six amperes in coil 24, and transformer 19 has a 1 to 1 ratio, when the current in conductor 17 reaches six amperes the contacts 7 and 8 will be brought into engagement and current will flow from battery 10 through coil 13, which will energize core 15 and open switch 16. The action of the disk 1 will, however, be delayed by magnet 9, which delay in this case we will assume is ten seconds. But suppose through some accident the current in conductor 17 suddenly increases to twelve amperes, then the core 23 will be working above saturation and there will be less current in coil 5 in proportion to that in conductor 17 than under the previous condition. The value of the current in coil 5 may be only eight amperes, while the torque upon disk 1 will be sufficiently increased to bring contacts 7 and 8 into engagement in five seconds. If the twelve amperes in transformer 19 had passed through coil 5, the torque in disk 1 would have increased to such an extent as to bring contacts 7 and 8 into engagement almost instantly. By adjustment of the resistance 26, or by otherwise properly proportioning the parts, two or more relays that are connected in series may be made selective, so that only the one nearest the trouble will operate.

It is sometimes desirable to interrupt the circuit at a very much lower value of current flowing in one direction, relative to the voltage, than when flowing in the other direction. To this end the coil 32 is wound upon an intermediate leg of the core 23, and supplied with current substantially in phase with the voltage of the circuit being controlled in such a way that when power is flowing in the right direction through conductors 17 and 18, the instantaneous magnetism produced by coils 24 and 32 will be in opposite directions; that is, from right to left through one, and from left to right through the other. Therefore coil 32 will rob coil 22 of part of the magnetism produced by coil 24, and the induced voltage drop across coil 22 will be less, requiring more current in coil 24 to produce the same effect on coil 5 as if coil 32 together with its core leg were removed. But if the relative direction of the currents in coils 24 and 32 change, then the magnetism of coil 32 will add to the magnetism of coil 24 producing a greater induced voltage drop across coil 22, while the current supplied to coil 5 will be greater than if coil 32 and its core were removed, and the disk 1 will close contacts 7 and 8 with very much less current in conductor 17 than was the case when power was flowing in the normal direction.

Consider now the action of the relay when there is no current flowing in conductor 17, but with full potential supplied to coil 32. In this case, the magnetism of coil 32 will divide, part going through coil 24 and part through coil 22, but the magnetism passing through coil 22 will induce a voltage in coil 22 which will cause a current to flow in coils 22 and 5, but this current will produce a magnetism in opposition to that produced by coil 32, and as no current can flow through coil 24, owing to the high impedance of transformer 19, nearly all of the magnetism from coil 32 will pass through coil 24, where it meets with very little opposition. Therefore with potential alone on the circuit, there will be very little torque produced in the disk 1, because of the comparatively small amount of current caused to flow in the coil 5.

Another condition that might be experienced in practice is that of loss of potential on coil 32. Then the core of coil 32 would rob coil 22 of a part of the magnetism from coil 24, but there would still be sufficient potential drop across coil 22 due to the resultant voltage of self-inductance of coil 22 and the voltage due to the resistance 26, to cause the disk to close contacts 7 and 8.

From this it can be seen that there could be no condition in conductors 17 and 18 that would make the relay inoperative.

Claims:

1. The combination with an electric motor having an actuating winding, of a transformer comprising two windings, one of which is connected in parallel with the motor winding and the other of which is connected in series with both of the aforesaid windings, and a core member having legs, the said transformer winding surrounding different legs of the core member.

2. The combination with an electric motor having an actuating winding, of a transformer comprising two windings, one of which is connected in parallel with the motor winding and is provided with an adjustable resistance and the other of which is connected in series with both of the aforesaid windings, and a core member having legs, the said transformer windings surrounding different legs of the core member.

3. The combination with an electric circuit and an electro-responsive means having an actuating winding receiving current therefrom, and an armature upon which a torque is exerted substantially proportional to the square of the current in the said winding, of means interposed between the circuit and the winding of the electro-responsive means for causing the current in the said winding to vary disproportionately to that in the circuit.

4. The combination with an electric circuit, and a time-limit overload relay having an actuating winding receiving current from said circuit, of means interposed between the circuit and the relay winding whereby the current in the winding is increased in proportion to the current in the circuit at the lower values of the current in the circuit, and is decreased in proportion to the current in the circuit at the higher values thereof.

5. The combination with an electric circuit, means whereby current may be derived from the circuit proportional to that traversing the circuit, and a motor having an actuating winding receiving current from said current-deriving means, of a transformer interposed between the current-deriving means and the motor and comprising two windings, one of which is connected in parallel with the motor winding and the other of which is connected in series with both of the aforesaid windings.

6. The combination with an electric circuit, means whereby current may be derived from the circuit proportional to that traversing the circuit, and a motor having an actuating winding receiving current from said current-deriving means, of a transformer interposed between the current-deriving means and the motor and comprising two windings, one of which is connected in parallel with the motor winding and the other of which is connected in series with both of the aforesaid windings, and a core member having two legs, one of which is surrounded by one of said windings and the other of which is surrounded by the other winding.

7. The combination with an electric circuit, and a motor having an actuating winding receiving current therefrom, of a transformer interposed between the circuit and the motor winding having two windings, one of which is connected in parallel with the motor winding, and the other of which is connected in series with both of the aforesaid windings, and a core member that becomes saturated at the higher values of the currents traversing its windings.

8. The combination with an electric circuit, and a motor having an actuating winding receiving current therefrom, of a transformer interposed between the circuit and the motor winding, having two windings disposed in poor inductive relation to each other, one of which is connected in parallel with the motor winding, and the other of which is connected in series with both of the aforesaid windings.

9. The combination with an electric circuit, and a motor having an actuating winding receiving current therefrom, of a device having two windings, one of which is connected in parallel with the motor winding, and the other of which is connected in series with both of the aforesaid windings and receives current proportional to that traversing the circuit, and a third winding that opposes the said series winding and receives current proportional to the voltage of the said circuit.

10. The combination with an electric circuit, and a motor having an actuating winding receiving current therefrom, of a device having two windings that supplement each other, one of which is connected in parallel with the motor winding, and the other of which is connected in series with both of the aforesaid windings and receives current proportional to that traversing the circuit, and a third winding that opposes the said series winding and receives current proportional to the voltage of the said circuit.

11. The combination with an electric circuit and an electro-responsive means having an actuating winding receiving current therefrom, and an armature upon which a torque is exerted substantially proportional to the square of the current in the said winding, of means interposed between the circuit and the winding of the electro-responsive means for causing the torque of the motor to vary approximately proportionately to the current in the said circuit.

12. The combination with an electric circuit and an electrical time-limit overload relay device comprising a winding receiving current that varies in direct relation with that in the circuit, and an armature actuated by currents in said winding, of means associated with said winding whereby, under certain overload conditions, the current traversing it is caused to be substantially proportionate to that in the circuit and is caused to vary disproportionately to that in the circuit under certain other conditions.

13. The combination with an electric circuit and an electrical time-limit overload relay device comprising a winding receiving current that varies in direct relation with that in the circuit, and an armature actuated by currents in said winding, of means associated with said winding whereby, under certain overload conditions, the current traversing it is caused to be substantially proportional to that in the circuit and is caused to remain more nearly uniform in value notwithstanding variations of the current in the circuit under certain other conditions.

14. The combination with an electric circuit, and an overload time-limit relay device comprising a winding receiving current therefrom that is dependent in value upon that traversing the circuit, and an armature actuated by currents in said winding, of a normally operative inductive device included in the connections between the said circuit and the said relay device and having a winding connected in shunt to the aforesaid winding.

15. The combination with an electric circuit, and an electrical overload time-limit relay device comprising a winding receiving current therefrom that is dependent in value upon that traversing the circuit and an armature actuated by currents in said winding, of a normally operative inductive device included in the connections between the said circuit and the said relay device and having a winding connected in shunt to the aforesaid winding, and also a core member that becomes saturated at a predetermined value of current in the circuit.

16. The combination with an electric circuit and an overload relay device comprising a winding receiving current that varies in direct relation with that in the circuit, and an armature actuated by currents in said winding, of means associated with said winding whereby, under certain overload conditions, the torque produced in the armature is caused to vary at a greater rate than the current in the electric circuit and is caused to vary at a lesser rate than the current in the circuit under certain other conditions.

17. The combination with an electric circuit and an electro-responsive device having an actuating winding receiving current therefrom, and an armature upon which a torque is exerted substantially proportional to the square of the current in the said winding, of means associated with the winding for causing the current in the said winding to vary disproportionately to that in the circuit.

18. The combination with an electric circuit and an electro-responsive device having an actuating winding receiving current therefrom, and an armature upon which a torque is exerted by the current in the winding, of means associated with the winding whereby the torque exerted in the armature is greater in proportion to the current in the electric circuit at low values of current in the electric circuit than at greater values of said current.

19. The combination with an electric circuit and an electro-responsive device having an actuating winding receiving current therefrom, and an armature upon which a torque is exerted substantially proportional to the square of the current in the said winding, of means associated with the said winding for causing the current therein to vary substantially as the square root of the current in the circuit.

20. The combination with an electric circuit and an electro-responsive device having an actuating winding receiving current therefrom, and an armature upon which a torque is exerted substantially proportional to the square of the current in the said winding, of means associated with the said winding for increasing the current received from said circuit when the current therein is small and for decreasing the current received from said circuit when the current therein is large.

21. A time-element overload relay comprising a movable member, an actuating winding for said member responsive to current in an electric circuit, and a reactance device coöperating with said winding and proportioned to saturate when the overload current through said winding exceeds a definite limit and modify the effect produced by said excess overload current through said winding and cause said winding to exert upon said member a force which is one power of said overload current when said current is within said definite limits and is another and lesser power when said current exceeds said limit.

22. An overload relay for electric circuits comprising a movable circuit controlling member, an actuating winding for exerting on said member a force dependent on the current in the circuit to be protected, a retarding device for opposing movement of said member, and a second winding coöperating with said actuating winding in response to an overload beyond a predetermined limit to modify the magnetic flux due to said actuating winding and thereby modify the effect of said actuating winding upon said member during excessive overload.

23. A time limit overload relay having a retarded movable member, a current coil for moving said member, and a reactive shunt across said coil proportioned to be saturated in response to the voltage drop across said shunt due to an overload in excess of a predetermined amount.

24. A time limit relay having a retarded movable member, a current coil for moving said member, and a reactance in shunt to said coil and proportioned to saturate and thereby modify the action of said relay as the current through said coil exceeds a predetermined limit.

25. A protective device for electric circuits comprising a movable metallic member, electro-responsive actuating means connected to an energizing circuit for moving said member, a retarding device for opposing movement of said member, means for impressing upon said energizing circuit a voltage dependent upon the conditions in the circuit to be protected, and a reactive shunt connected across said energizing circuit and in parallel to said actuating means and proportioned to saturate when the voltage on said energizing circuit exceeds a predetermined amount.

In testimony that I claim the foregoing as my own, I have hereto affixed my signature in the presence of two witnesses.

FORREST E. RICKETTS.

Witnesses:
JOHN T. FARDY,
IRVIN FROEHLICK.